(12) United States Patent
Farran et al.

(10) Patent No.: US 12,411,999 B2
(45) Date of Patent: Sep. 9, 2025

(54) CUSTOMIZED ARTIFICIAL FINGERNAIL GENERATION SYSTEMS

(71) Applicant: Nimble Official Limited, London (GB)

(72) Inventors: Georgina Farran, London (GB); Christopher Mosedale, London (GB)

(73) Assignee: Nimble Official Limited, London (GB)

(*) Notice: Subject to any disclaimer, the term of this patent is extended or adjusted under 35 U.S.C. 154(b) by 1000 days.

(21) Appl. No.: 17/502,656

(22) Filed: Oct. 15, 2021

(65) Prior Publication Data

US 2023/0124480 A1   Apr. 20, 2023

(51) Int. Cl.
 G06F 7/48       (2006.01)
 G06F 30/10      (2020.01)
 G06F 30/27      (2020.01)
 G06F 119/18     (2020.01)

(52) U.S. Cl.
 CPC .............. *G06F 30/10* (2020.01); *G06F 30/27* (2020.01); *G06F 2119/18* (2020.01)

(58) Field of Classification Search
 CPC ............. A45D 2029/005; A45D 31/00; G06V 10/243; G06V 10/32; G06V 10/44; G06V 10/764; G06V 2201/03; G06V 40/107; G06F 2119/18; G06F 30/10; G06F 30/27
 See application file for complete search history.

(56) References Cited

U.S. PATENT DOCUMENTS

| | | | |
|---|---|---|---|
| 5,196,234 A | 3/1993 | Taubner et al. | |
| 5,382,217 A | 1/1995 | Namowitz | |
| 6,328,949 B1 | 12/2001 | Tessarolo et al. | |
| 2004/0143359 A1 | 7/2004 | Yogo et al. | |
| 2009/0092310 A1* | 4/2009 | Gifford | A61Q 3/00 382/141 |
| 2011/0087351 A1 | 4/2011 | Sachdeva et al. | |

(Continued)

FOREIGN PATENT DOCUMENTS

| | | |
|---|---|---|
| JP | 2012-232042 A | 11/2012 |
| JP | 2014-117455 A | 6/2014 |

(Continued)

OTHER PUBLICATIONS

Jan. 4, 2023—(PCT/GB) International Search Report & Written Opinion—App 2022/052606.

(Continued)

*Primary Examiner* — Nithya J. Moll
(74) *Attorney, Agent, or Firm* — Banner & Witcoff, Ltd.

(57) ABSTRACT

Aspects described herein may allow for generating a set of customized artificial fingernails based on the shape and size of the fingernails of an individual user. A computing system may generate an output file to produce the customized artificial fingernails based on a set of images displaying top-down views of a set of fingernails of a user. A reference table may be used to predict the curvature factor of each of the user's fingernails to provide information for the system regarding the three-dimensional size and shape of the user's fingernail simply based on the two-dimensional top-down views of fingernails in the set of images. That may help the user to get customized artificial fingernails in an easy and convenient way without the burden to display the user's fingernails from multiple angles.

18 Claims, 9 Drawing Sheets

(56) References Cited

U.S. PATENT DOCUMENTS

| | | | |
|---|---|---|---|
| 2011/0186067 A1* | 8/2011 | Coppola | B29C 70/78 132/73 |
| 2012/0103210 A1 | 5/2012 | Hashimoto | |
| 2013/0038648 A1 | 2/2013 | Kasahara | |
| 2014/0183769 A1 | 7/2014 | Li et al. | |
| 2015/0173483 A1 | 6/2015 | Raouf et al. | |
| 2017/0193651 A1 | 7/2017 | Yamasaki | |
| 2018/0336737 A1 | 11/2018 | Varady et al. | |
| 2020/0135310 A1 | 4/2020 | Gedamu | |
| 2021/0030133 A1 | 2/2021 | Song et al. | |
| 2021/0120935 A1 | 4/2021 | Shashou et al. | |

FOREIGN PATENT DOCUMENTS

| | | | |
|---|---|---|---|
| KR | 10-2011-0101106 | | 9/2011 |
| KR | 101844347 | B1 | 5/2018 |
| WO | 2015126533 | A1 | 8/2015 |
| WO | 2015132734 | A1 | 9/2015 |

OTHER PUBLICATIONS

Kim et al., "Classification of Adult Women's Fingernail Type," Fashion & Text. Res. J., vol. 22, No. 4, pp. 504-514 (2020), https://doi.org/10.5805/SFTI.2020.22.4.504.

Murdan, Sudaxshina, "Transverse fingernail curvature in adults: a quantitative evaluation and the influence of gender, age, and hand size and dominance," Department of Pharmaceutics, The School of Pharmacy, University of London, 29-39 Brunswick Square, London, WC1N 1AX, UK.

Jung JW et al., "Fingernail Configuration," Archives of Plastic Surgery (APS), vol. 42, No. 6. (Nov. 2015), pp. 753-760.

Jan. 23, 2020—(PCT/KR) International Search Report and Written Opinion—App 2019/012475—partial Eng. Translation (9 pages).

\* cited by examiner

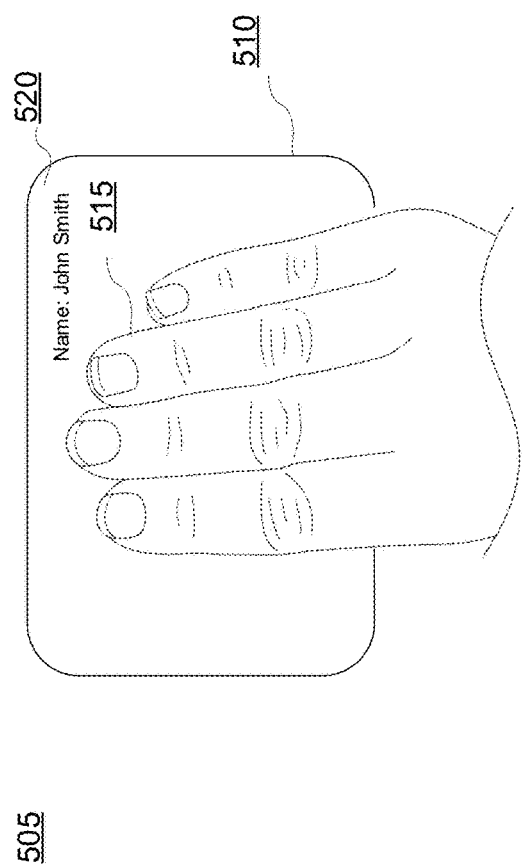
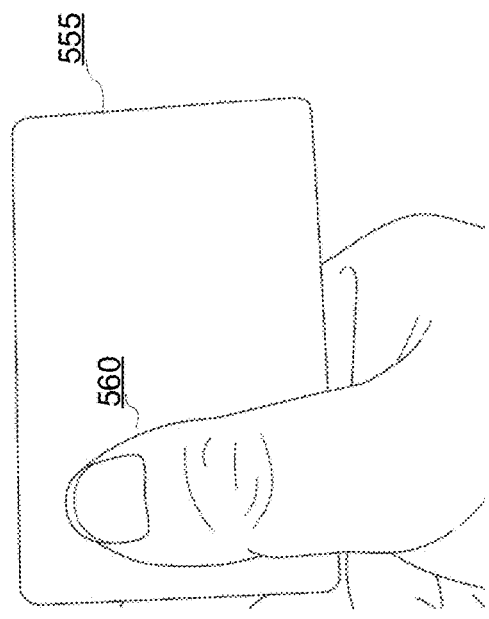
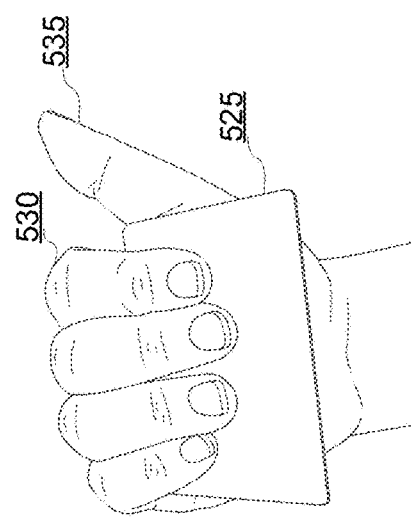
FIG. 5A
FIG. 5B
FIG. 5C

| Finger | Women | | | |
|---|---|---|---|---|
| | 40s | | 50s | |
| | Mean | SD | Mean | SD |
| Thumb | 9.6 | 0.8 | 9.9 | 0.8 |
| Index | 7.2 | 0.5 | 7.7 | 0.6 |
| Middle | 7.4 | 0.6 | 7.6 | 0.6 |
| Ring | 6.4 | 0.6 | 7.0 | 0.6 |
| Little | 5.0 | 0.4 | 5.5 | 0.7 |

CUSTOMIZED ARTIFICIAL FINGERNAIL GENERATION SYSTEMS

FIELD OF USE

Aspects of the disclosure relate generally to image processing and machine learning, and hardware and software related thereto. More specifically, aspects of the disclosure may provide customized artificial fingernail generation systems.

BACKGROUND

Artificial fingernails that are configured to be attached to a user's fingernails are popular substitutes for traditional nail painting. In order to make decorations on a user's fingernails, the user may purchase a set of artificial fingernails from a store and stick the artificial fingernails on the user's fingers quickly and conveniently, without taking the time and effort to paint on each of the user's fingernails. However, the shape and size of those artificial fingernails are usually predetermined by the merchant and therefore do not fit the actual fingernails of each user. Therefore, a system configured to generate customized artificial fingernails conveniently for each individual user is needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Pre-manufactured artificial fingernails may not usually fit the unique shapes and sizes of the fingernails of each individual user. On the other hand, having a fingernail measurement in a nail salon to make customized artificial fingernails may be burdensome for the user. To overcome the limitations described above, and to overcome other limitations that will be apparent upon reading and understanding the present specification, aspects discussed herein may provide a system to generate an output file for production of a set of customized artificial fingernails to each individual user based on a set of images displaying top-down views of a set of fingernails of the user. The set of images may provide information associated with the unique shapes and sizes of the fingernails of the particular user in order to facilitate making the customized artificial fingernails, without burdening the user to conduct complicated measurements or capture multiple images of each finger from different angles. According to some aspects, an image comprising a top-down view of one or more fingernails may be captured by a camera above the nail plane such that the entire surface of the nail plate is visible in the image. This is as opposed to a side-view of the nail, captured along the side of the finger and only showing one side of the nail but capturing some information about curvature and depth. And it is opposed to an end-on view of the nail, captured at the tip of the finger. An end-on view can accurately identify the curvature of a user's finger, but can be challenging for a user to capture. Attributes of the user, such as age, gender and/or handedness, may provide useful input to determine a typical curvature of the user's fingernail. While not as precise as measuring the exact curvature of the user's finger, this approach does not require additional views beyond the top-down view of each finger. Aspects described herein recognize that a top-down view of a fingernail, combined with predicting curvature of the user's nails based on user attributes using a reference table of average curvature parameters, can generate excellent results without the complication of requiring side views and/or end-on views. That may ease the burden of the user during the artificial fingernail customization process since the user may not need to display the user's fingernails from multiple angles.

In one or more illustrative embodiments, a computing device may receive a set of images and one or more user attribute parameters, wherein the set of images may comprise top-down views of a set of fingernails of a user, wherein each image of the set of images may comprise at least one reference object, and wherein the one or more user attribute parameters may comprise demographic information corresponding to the user. The computing device may determine, based on a corresponding reference object in each respective image of the set of images, a set of scaling factors for the set of images. The computing device may detect, for the set of fingernails and by using one or more machine learning models configured to detect an initial fingernail border for a fingernail in an image, a set of initial fingernail borders within the set of images, wherein each initial fingernail border may correspond to a respective area, of a corresponding image, associated with a respective fingernail and distinguished from a remainder of the corresponding image. The computing device may divide, for each fingernail of the set of fingernails, the respective area associated with the corresponding initial fingernail border into a corresponding first portion and a second portion. The computing device may determine, based on the respective first portion associated with each initial fingernail border and a symmetrical projection of the respective first portion, a set of revised fingernail borders within the set of images. The computing device may determine, for the set of fingernails and based on a reference table, a set of curvature factors based on the user attribute parameters, wherein the reference table may indicate, for different combinations of user attribute parameter values, a corresponding curvature factor comprising one or more curvature parameters for each respective fingernail of the set of fingernails. The computing device may generate, for the set of fingernails, a set of scaled and flattened nail masks based on the set of revised fingernail borders, wherein generating a given scaled and flattened nail mask corresponding to a respective fingernail may be based on applying a corresponding scaling factor, of the set of scaling factors, and a corresponding curvature factor, of the set of curvature factors, to the corresponding revised fingernail border, of the set of revised fingernail borders. And the computing device may generate, based on the set of scaled and flattened nail masks, an output file for production of a set of artificial nails corresponding to the set of fingernails.

In some instances, the reference table may indicate, for different values of age and gender, different curvature factors for each respective fingernail of the set of fingernails. The one or more user attribute parameters may further comprise handedness of the user.

In some instances, the one or more user attribute parameters may further comprise at least one of: weight of the user, height of the user, length of the user's hand, width of the user's hand, length of one or more fingers of the user, width of one or more fingers of the user, shape of the set of fingernails, or health conditions of the set of fingernails.

In some instances, the computing device may determine, based on the respective first portion associated with each initial fingernail border and a symmetrical projection of the respective first portion, a set of revised fingernail borders within the set of images by providing the respective first portion associated with each initial fingernail border as input to a second machine learning model and determining the set of revised fingernail borders using the second machine learning model, based on the respective first portions and the symmetrical projections.

In some instances, the computing device may detect the set of initial fingernail borders within the set of images by detecting, for the set of fingernails and using a first machine learning model configured to detect a rough initial fingernail border for a fingernail in an image, a set of rough initial fingernail borders within the set of images; and refining, using a second machine learning model configured to refine a rough initial fingernail border for a fingernail in an image, a set of refined initial fingernail borders within the set of images.

In some instances, the set of images may comprise a first image comprising a first reference object and top-down view of a thumb of the user; and a second image comprising a second reference object and top-down view of an index finger, a middle finger, a ring finger, and a pinky finger of the user.

In some instances, the computing device may generate the given scaled and flattened nail mask corresponding to the respective fingernail by generating a corresponding scaled nail mask by applying the corresponding scaling factor, of the set of scaling factors, to the corresponding revised fingernail border, of the set of revised fingernail borders; and applying the corresponding curvature factor, of the set of curvature factors, to the corresponding scaled nail mask.

In some instances, the computing device may generate the given scaled and flattened nail mask corresponding to the respective fingernail by generate a corresponding flattened nail mask by applying the corresponding curvature factor, of the set of curvature factors, to the corresponding revised fingernail border, of the set of revised fingernail borders; and applying the corresponding scaling factor, of the set of scaling factors, to the corresponding flattened nail mask.

In some instances, the output file may further comprise three-dimensional model data for producing the set of artificial nails.

In some instances, the computing device may further detect, using a second machine learning model, a presence of a health issue in one of the set of fingernails, wherein the second machine learning model is trained to recognize the health issue based on a training data set comprising a plurality of training images, each training image of the training data set comprises a label identifying at least one health issue of a fingernail in the training image; and may adjust, based on the presence of the health issue, the initial fingernail border, the revised fingernail border, or the curvature factor corresponding to the one of the set of fingernails.

In some instances, the computing device may further detect, using a second machine learning model, personally identifiable information presented in the set of images, wherein the second machine learning model is trained to recognize personally identifiable information; and may blur, prior to determining the set of revised fingernail borders, the personally identifiable information in the set of images.

In some instances, each of the set of scaling factors may comprise a size factor and a skew factor. The computing device may further apply, to each image of the set of images, a corresponding skew factor before detecting one or more initial fingernail borders in the respective image.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5D depict illustrative images that the system may process in accordance with one or more illustrative aspects discussed herein;

DETAILED DESCRIPTION

Figure 1:
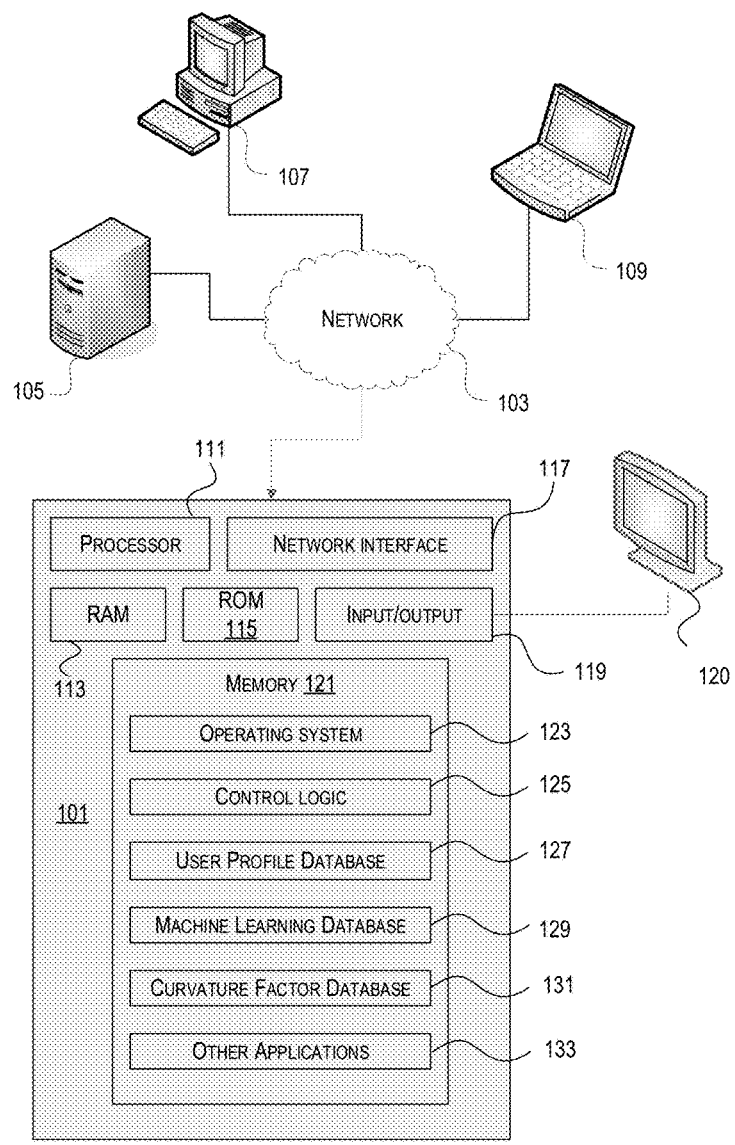
FIG. 1 depicts an example of a computing device in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for generating customized artificial fingernails. Pre-manufactured artificial fingernails may poorly fit the unique shapes and sizes of the fingernails of each individual user. On the other hand, having a fingernail measurement in a nail salon to make customized artificial fingernails may be burdensome for the user. To overcome the limitations described above, and to overcome other limitations that will be apparent upon reading and understanding the present specification, aspects discussed herein may provide a system to generate an output file for production of a set of customized artificial fingernails to each individual user based on a set of images displaying top-down views of a set of fingernails of the user. The set of images may provide information associated with the unique shapes and sizes of the fingernails of the particular user in order to facilitate making the customized artificial fingernails, without burdening the user to conduct complicated measurements or take multiple images of each finger from different angles. Although fingernails are curved, a top-down view may be an image captured by a camera above the nail plane such that the entire surface of the nail plate is visible in the image. This is as opposed to a side-view of the nail, captured along the side of the finger and only showing one side of the nail but capturing some information about curvature and depth. And it is opposed to an end-on view of the nail, captured at the tip of the finger. An end-on view can accurately identify the curvature of a user's finger, but can be challenging for a user to capture. Attributes of the user, such as age and gender, may provide a useful input to determine a typical curvature of the user's fingernail. While not as precise as measuring the exact curvature of the user's finger, this approach does not require additional views beyond the top-down view of each finger. Aspects described herein recognize that a top-down view of a fingernail, combined with predicting curvature of the user's nails based on user attributes using a reference table of average curvature parameters, can generate excellent results without the complication of requiring side views and/or end-on views. That may ease the burden of the user during the artificial fingernail customization process since the user may not need to display the user's fingernails from multiple angles.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

The data transferred via the network 103 may include secure and sensitive data, such as confidential documents, customer personally identifiable information, and account data. Therefore, it may be desirable to protect transmissions of such data using secure network protocols and encryption, and/or to protect the integrity of the data when stored on various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating detecting initial fingernail borders, rectifying images, detecting revised fingernail borders, and/or other functions described herein. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user profile database 127, machine learning database 129, curvature factor database 131, and other applications 133 may be stored in a memory of a computing device used at a server system that will be described further below. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

The system may comprise a plurality of micro-applications. Each of the micro-application may perform one or more steps as described herein. The plurality of micro-applications may be operated on a single physical computing device 101, or the plurality of micro-applications may be operated on a plurality of computing devices 101 in a cloud system. For example, the cloud system may be developed or supported by a third-party cloud service provider such as Amazon Web Services (AWS). The plurality of computing devices 101 may communicate with each other over network 103 as shown in FIG. 1.

Figure 2:
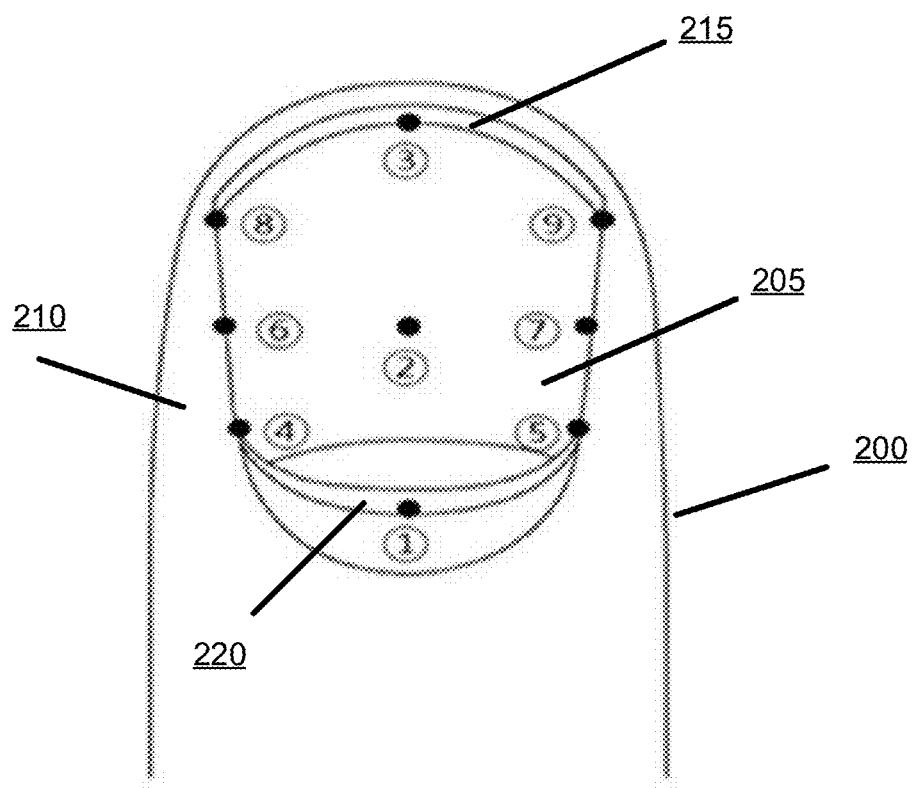
FIG. 2 depicts an illustrative finger having a fingernail viewed from top-down in accordance with one or more aspects described herein.

FIG. 2 depicts an illustrate finger 200 having a fingernail viewed from top-down. As is shown in FIG. 2, the finger 200 comprises a nail plate 205 and nail fold 210. The nail plate 205 may be a claw-like plate located near the fingertip and covers the nail bed (not shown in FIG. 2) underneath. Nail fold 210 may comprise skin and tissues that are located around the nail plate 205. A majority portion of the nail plate 205 is not covered by any skin or tissues and may therefore be visible. A minority portion of the nail plate 205 may be covered by the nail fold 210 and therefore invisible. An artificial nail may be attached to a finger and cover the visible portion of the nail plate 205. For the purpose of reference, a fingernail is referred to as the visible portion of the nail plate 205 where the artificial nail is configured to cover.

The nail plate 205 may comprise free edge 215. The free edge 215 is also known as the distal edge, which may comprise the anterior margin of the nail plate 205. The finger 200 may also comprise cuticle 220, which may comprise a layer of clear skin located along the bottom edge of the visible portion of the nail plate 205. An artificial nail may either cover cuticle 220 or not cover cuticle 220.

The view of the finger in FIG. 2 is "top-down" in that it is an image of the finger as viewed from above, relative to the plane of the fingernail (e.g., the nail plate 205). Although fingernails are curved, a top-down view may be an image captured by a camera above the nail plane such that the entire surface of the fingernail (e.g., nail plate 205) is visible in the image. This is as opposed to a side-view of the nail, captured along the side of the finger and only showing one side of the nail but capturing some information about curvature and depth. And it is opposed to an end-on view of the nail, captured at the tip of the finger. An end-on view can accurately identify the curvature of a user's finger, but can be challenging for a user to capture. Aspects described herein recognize that a top-down view of a fingernail, combined with a reference table of average curvature parameters, can generate excellent results without the complication of requiring side views and/or end-on views. However, each fingernail may be viewed, in a respective image, from a perspective that deviates from a strict tangential top-down view because it may be hard for a user to take photos with a strict top-down view of a single fingernail, and even harder to get a perfect top-down image of multiple fingers. Thus, as used herein a top-down view of the finger and fingernails may comprise an image of the subject fingers/fingernails as viewed from above, relative to the plane of the fingernail, that includes substantially all of the exposed top surface of the subject fingernails (e.g., in FIG. 5B, the user's four fingers 530 may be treated as viewed from top-down, while the user's thumb 535 may be treated as not viewed from top-down). A person of ordinary skill in the art would appreciate that, as is discussed further below, the system may rectify an image, by various image processing techniques, to approximate a strict top-down view of the fingernail in an image in order to restore the shape of the fingernail even if the original image comprises a view of a fingernail different from a strict top-down view.

FIG. 2 also depicts a plurality of reference points (e.g., reference points (1)-(9)) on the finger 200. Reference point (1) may refer to the central point of cuticle 220. Reference point (2) may refer to the central point of the nail plate 205. Reference point (3) may refer to the central point of the free edge 215. Reference point (4) may refer to the left-side point of the cuticle 220. Reference point (5) may refer to the right-side point of the cuticle 220. Reference point (6) may refer to the left medial point of nail fold 210. Reference point (7) may refer to the right medial point of nail fold 210. Reference point (8) may refer to the left-side point of free edge 215. Reference point (9) may refer to the right-side point of free edge 215. One or more of the plurality of reference points on a given fingernail may be identified from a respective image comprising a top-down view of that fingernail, as may be described herein. The identified reference points may be used by the system to process the image in order to generate an output file for production of the artificial fingernails in accordance with one or more illustrative aspects discussed herein. For example, as may be discussed in greater detail below, at least two of the reference points (1), (2), and (3) of a given fingernail may be identified on an image to determine a central vertical axis of the fingernail.

Figure 3:
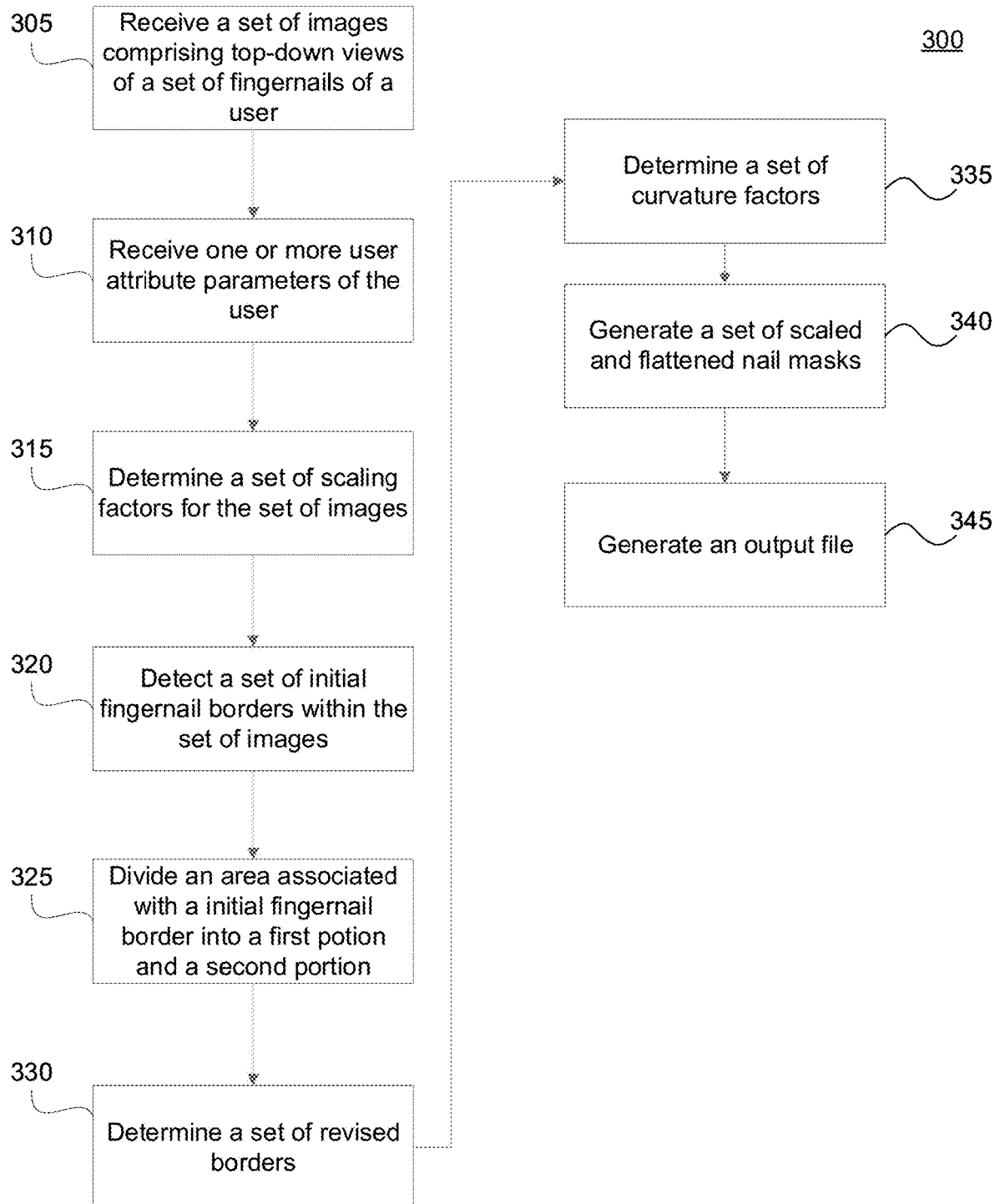
FIG. 3 depicts a flow diagram of an example method for generating artificial fingernails in accordance with one or more aspects discussed herein.

FIG. 3 depicts a flow diagram of an example method 300 for generating a set of artificial fingernails. The set of artificial nails may be configured to be attached to a set of fingernails of a user. Some or all of the steps of method 300 may be performed using a system that comprises one or more computing devices (e.g., computing device 101) as described herein. One or more steps of the example may be rearranged, omitted, and/or otherwise modified, and/or other steps may be added.

At step 305, the system may receive a set of images. The set of images may be sent to the system from a user device associated with a user who wants to purchase a set of customized artificial fingernails. For example, the user may download, on the user device (e.g., the user's smartphone, laptop, or tablet), an application associated with the system. The system may prompt the user to take a set of images. The set of images may comprise top-down views of a set of fingernails of a user. The prompts may be displayed via the user device and may comprise one or more requirements for each of the images (e.g., the system may request each fingernail of the set of fingernails to be viewed from top-down, may request each image to comprise at least one reference object, or may request each image to have a certain resolution, etc.).

After receiving the prompts, the user may capture the images by a camera associated with the user device, and the images may be uploaded to the system via the user device and through the application. In some embodiments, the application and/or system may also prompt the user to choose decoration patterns that may be painted on the artificial fingernails, or choose other aesthetic features that may be applied to the artificial fingernails.

The system may, after receiving the set of images, perform a preliminary check to determine whether all the images the user uploads fulfill the requirements. The system may notify the user to upload a new image to replace a previously uploaded image that does not fulfill one or more requirements.

The set of images may comprise top-down views of a set of fingernails of a user. As discussed above, the top-down view may comprise the entire visible surface of one or more fingernails (e.g., nail plate 205), as opposed to a side-view of the nail and is opposed to an end-on view of the nail. However, as also discussed above, each fingernail may be viewed, in a respective image, from a perspective that deviates from a strict tangential top-down view. Thus, as used herein a top-down view of the finger and fingernails may comprise an image of the subject fingers/fingernails as viewed from above, relative to the plane of the fingernail, that includes substantially all of the exposed top surface of the subject fingernails. A person of ordinary skill in the art would appreciate that, as is discussed further below, the system may rectify an image, by various image processing techniques, to approximate a strict top-down view of the fingernail in an image in order to restore the shape of the fingernail even if the original image comprises a view of a fingernail different from a strict top-down view.

Each image of the set of images may also comprise at least one reference object. The reference object may be the view of any object whose dimensions are known by the system. For example, a reference object may be a standard identification card, a credit card, a coin, or a book with the book's length and width input by the user. As discussed further herein, the known dimensions of the reference object may be used to determine scale factors for use in rectifying the image, determining the dimensions of the user's fingernails, and/or correcting common imaging problems.

In some implementations, at least one of the surfaces of the object may be flat. The user may be prompted to capture an image of the fingernails while the fingers are in close contact with the flat surface of the object. FIGS. 5A-5B depict two exemplary ways that a user may show top-down views of the user's index finger, middle finger, ring finger and pinky finger in one hand with the fingers be in close contact with an object whose view may be used as a reference object in the image. As is shown in FIG. 5A, an image 505 may comprise a reference object (e.g., a standard ID card) 510 and top-down views of the user's four fingers 515. The user may have the four fingers 515 touch firmly on the surface of the object 510 with the user's palm facing down. As is shown in FIG. 5B, an image 518 may comprise a reference object 525 and the user's four fingers 530. The user may hold the object 525 with the user's four fingers 530 touching one side of the card 525, and the user's palm touching the other side of the object 525. FIG. 5C depicts an exemplary way that the user may show a top-down view of the user's thumb together with a reference object. As is shown in FIG. 5C, an image 550 may comprise a reference object 555 and a top-down view of the user's thumb 560. The user may have the thumb 560 firmly touch the object 555.

Having an object with a flat surface as a reference object and/or having the user's fingers in close contact with the flat surface of the object may be helpful to provide a more precise size and shape of the fingernails. However, an object having other types of surfaces (e.g., a ball) may also be possible.

In some implementations, the user may be prompted to capture an image of each fingernail within a boundary box created by the reference object. Referring back to FIG. 5A, the reference object may be a standard ID card, and the boundary of the reference object 510 may comprise the four edges of the card. The boundary box may comprise the area within the four edges. As shown in FIG. 5A, top-down views of all the four fingernails may be located within the boundary box of the reference object 510. This arrangement may be helpful to obtain the accurate size and/or shape of the fingernails, as well as to distinguish the borders of each finger from the surroundings.

The system, and/or the user device, may detect, using a machine learning model, personally identifiable information (e.g., the user's name, card number, or address) presented in the set of images. For example, referring to FIG. 5A, the reference object 510 may comprise the user's name "John Smith" 520. The machine learning model may be trained to recognize personally identifiable information. The system and/or the user device may blur the personally identifiable information in the set of images (e.g., blur the name "John Smith" 520 in image 505 by altering or deleting the pixels associated with the name 520).

In some instances, the set of images may comprise all fingernails to which the user wants to make artificial fingernails to attach. For example, if the user wants to make a set of artificial fingernails to attach to all of the user's ten fingers, the set of images may comprise top-down views of all of the ten fingernails. For example, the set of images may comprise four images. A first image may comprise top-down views of the user's index finger, middle finger, ring finger, and pinky finger of the user's right hand. A second image may comprise a top-down view of the user's thumb of the user's right hand. A third image may comprise top-down views of the user's index finger, middle finger, ring finger, and pinky finger of the user's left hand. A fourth image may comprise a top-down view of the user's thumb of the user's left hand.

In other instances, the set of images may comprise less than all fingernails to which the user wants to make artificial fingernails to attach. Consistent with the example where the user wants to make artificial fingernails to attach to all of the ten fingers, the set of images may have two images. For example, a first image may comprise top-down views of the user's index finger, middle finger, ring finger, and pinky finger of the user's left or right hand. A second image may comprise a top-down view of the user's thumb of the user's left or right hand. The system may produce the same artificial fingernails to be attached to each respective finger on the other hand.

At step 310, the system may receive one or more user attribute parameters of the user. The one or more user attribute parameters may comprise any information that is associated with the user's biographical or demographical characteristics. As discussed below, the user attribute parameters may be used to predict a curvature factor for each of the user's fingernails. For example, the user attribute parameters may comprise one or more of: the user's age, gender, handedness, body weight, height, the length of the user's hand, the width of the user's hand, the length of one or more fingers of the user, the width of one or more fingers, the shape of one or more fingernails, the length of one or more fingernails, the width of one or more fingernails, or health conditions of one or more fingernails. Some of the user attribute parameters may be received from a user's input. For example, the user may use a mobile application to upload the user attribute parameters (e.g., age, gender, handedness). Other of the user attribute parameters may be obtained from the set of images. For example, the length of a given fingernail may be calculated based on a corresponding image and the reference object in that image, as may be discussed in greater detail below. As discussed further herein, implementation according to some aspects may focus on receiving age and gender information about the user, and estimate curvature in preparing artificial nails using a reference table that indicates curvature parameters corresponding to different pairs of age/gender.

At step 315, the system may determine, based on a corresponding reference object in each respective image of the set of images, a set of scaling factors for the set of images. Each scaling factor of the set of scaling factors may be associated with a respective image of the set of images. The scaling factor may comprise one or more indications that may be used to transform views of fingernails presented in a respective image into one or more fingernail masks having a shape and/or size corresponding to the one or more fingernails of the user in reality. The scaling factor may be obtained based on a comparison between the size and/or shape of the reference object in the image and the size and/or shape of the corresponding object in the reality.

A scaling factor may comprise a size factor, a skew factor, a rotation factor, and/or any other factors that may be used to rectify or otherwise process the image. The size factor may indicate a corresponding relationship between a size unit in the image and a size unit in the reality. For example, if a reference object is a view of a standard ID card, the system may determine that the short edge of the card, viewed in the image, is 26.99 pixels, while that short edge of the corresponding card, in the reality, is 53.98 millimeters (mm). The system may determine a scaling factor (e.g., a size factor) as each pixel in the image represents 2 mm in the reality.

Figure 5D:
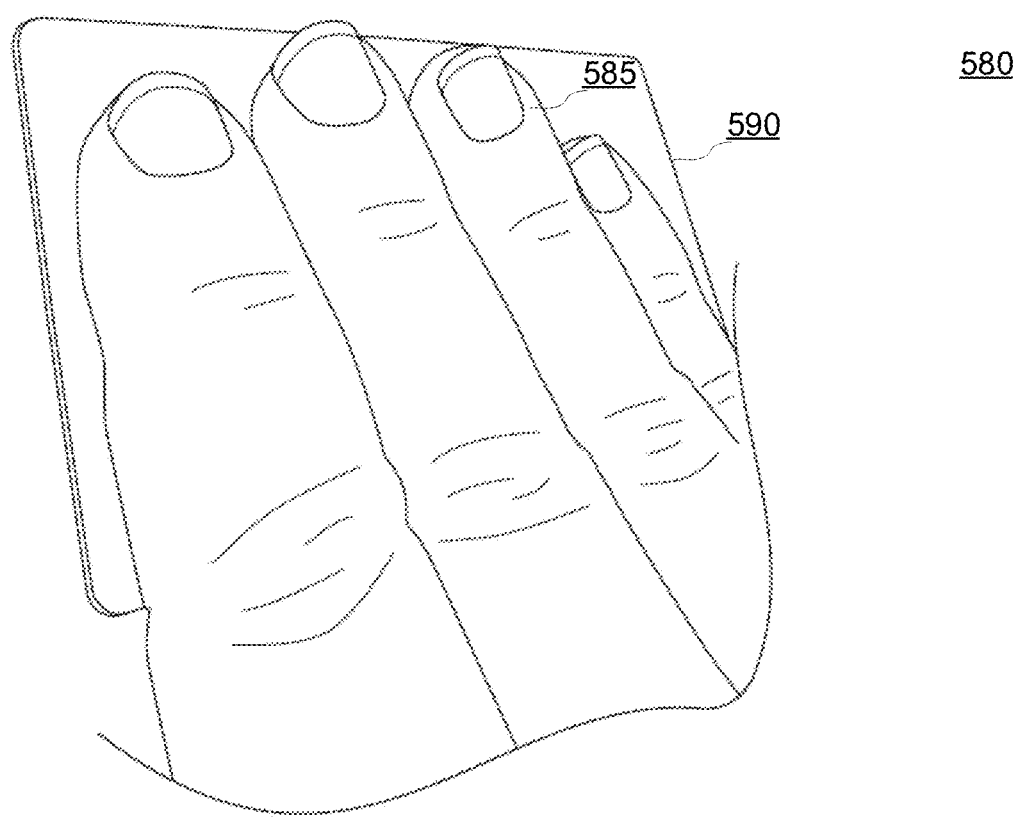

The skew factor may indicate the angle differences between a strict top-down view and the perspective of one or more fingernails viewed in the image. For example, FIG. 5D depicts an image 580 comprising a top-down view of a user's four fingers 585 and a reference object 590. The reference object 590 may be a card with a rectangular shape. However, the left edge of the card 590 viewed in the image 580 may look longer than the right edge of the card 590. This may be because the image 580 is a photo taken with the left side of the card 590 closer to the camera and the right side of the card 590 further away from the camera. The system may determine the angle differences based on the fact that the left edge of the card 590 is longer than the right edge of the card 590 in a certain amount, and the fact that both edges of the corresponding object in the reality are equal in length.

The rotation factor may indicate the degree that the image is to be rotated to obtain a desired orientation. As may be discussed in greater detail below in FIG. 4, the rotation factor in a given image may be obtained based on the reference object in the image, or based on the one or more fingernails viewed in the image.

The scaling factors may be used throughout the method illustrated in FIG. 3 as appropriate to adjust the images and/or detect the fingernail borders. For example, the skew factors and/or rotation factors may be applied to the images prior to detecting the initial fingernail borders as described below, while the size factors may be applied after determining the revised fingernail borders as described below. Aspects relating to applying the scaling factors to the received and/or processed images are discussed further herein with respect to FIG. 4 below.

At step 320, the system may detect, for the set of fingernails, a set of initial fingernail borders within the set of images. Each initial fingernail border may correspond to a respective area, of a corresponding image, associated with a respective fingernail and distinguished from a remainder of the corresponding image.

Figure 6A:
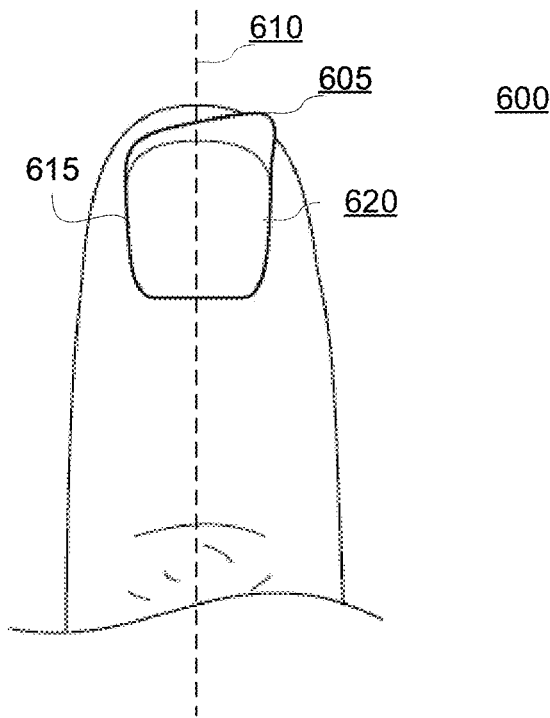
FIGS. 6A-6B depict illustrative images that the system may process in accordance with one or more illustrative aspects discussed herein.

FIG. 6A depicts an illustrative finger 600 viewed in an image of the set of images. The system may detect the initial fingernail border 605. The area inside the initial fingernail border 605 may substantially correspond to the visible portion of the nail plate of the finger 600 and be distinguished from the remainder of the image (e.g., nail fold viewed in the image and/or the reference object in the image).

Referring back to step 320, the system may detect the initial fingernail border 605 using one or more machine learning models trained to detect initial fingernail borders based on a training data set comprising a plurality of training images, each training image of the training data set comprises a label identifying at least one initial fingernail border in the training image. Alternatively or additionally, the system may detect the initial fingernail border 605 based on an input of a person. For example, the person may be responsible to draw the initial fingernail border independently, or be responsible to draw an initial fingernail border that is later smoothed by a machine learning model, or be responsible to correct any mistakes made by a machine learning model. In some implementations, the system may apply one or more of the scaling factors to the set of images before, or during, processing by the one or more machine learning models in step 320. For example, the system may apply a rotation factor and a skew factor to rectify the images, as may be described in FIG. 4 below.

The system may detect the set of initial fingernail borders 605 by a two-stage process. The system may first detect a set of rough initial fingernail borders within the set of images. In some implementations, the system may detect the rough initial fingernail borders by using a first machine learning model configured to detect a rough initial fingernail border for a fingernail in an image. In other implementations, the system may detect the rough initial fingernail borders by various image processing techniques such as region detections or contiguous line detections.

The shape of a rough initial fingernail border may deviate from the shape of the corresponding fingernail viewed from top-down, due to various reasons. For example, the system may include a small portion of the nail fold into the area associated with the rough initial fingernail border because of a shadow on or around the fingernail. In order to minimize the deviation, the system may generate a set of refined initial fingernail borders within the set of images by using a second machine learning model configured to refine a rough initial fingernail border for a fingernail in an image. The second machine learning model may revise a portion of a rough initial fingernail border based on the expected shape of the top-down view of the fingernail in the respective finger. The second machine learning model may be trained to predict the shape of the top-down view of the fingernail of a respective finger based on a training data set comprising a plurality of training images, each training image of the training data set may comprise a label identifying at least one initial fingernail border in the training image.

The initial fingernail border 605 may be further optimized. For example, the system may detect, using a machine learning model trained to detect common health issues, a presence of health issues in one of the set of fingernails. For example, the system may detect an uneven free edge or cuticle. The unevenness may be caused by the user's habit to bite the finger. The system may smooth the uneven free edge or cuticle associated with the initial fingernail border 605 so that the initial fingernail border 605 shows a shape of a fingernail healthier than the actual corresponding fingernail of the user. This may improve the aesthetic value of the artificial fingernail produced based on the initial fingernail border 605. The machine learning model used for health issues may be trained to recognize the health issue based on a training data set comprising a plurality of training images, each training image of the training data set may comprise a label identifying at least one health issue of a fingernail, as well as a corresponding optimized shape of the initial fingernail border, in the training image. The system may also generate prompts to the user, via the user device, for curing the health issues. For example, the system may detect an uneven cuticle is caused by a nail infection and may prompt the user to purchase a hand cream or proceed with a treatment to cure the infection.

At step 325, the system may divide, for each fingernail of the set of fingernails, the respective area of the corresponding initial fingernail border 605 into a corresponding first portion and a second portion. For example, the first portion may be a left portion and the second portion may be a right portion. The system may divide the first portion and the second portion by a series of operations. For example, the system may first determine a left boundary and a right boundary of a given initial fingernail border. And then, the system may determine a central point in the middle of the left boundary and the right boundary. The system may determine a vertical axis crossing the central point and then divide the first portion and the second portion by the vertical axis. For example, the vertical axis may connect the central point of the nail plate (e.g., reference point (2) as shown in FIG. 2) and the central point of the cuticle (e.g., reference point (1) as shown in FIG. 2). Using other reference points (e.g., reference point (3) as shown in FIG. 2) are also possible. Consistent with the example in FIG. 6A, the vertical axis may be axis 610. Vertical axis 610 may divide the area within the initial fingernail border 605 into a first portion 615 and a second portion 620.

At step 330, the system may determine, based on the respective first portion of each initial fingernail border and on a symmetrical projection of a portion of a fingernail area, a set of revised fingernail borders within the set of images.

In some instances, for each initial fingernail border 605, the system may select, between the first portion and the second portion associated with that initial fingernail border 605, a base portion. The system may generate a mirror projection of the base portion, and may replace the non-selected portion with the mirror projection of the base portion to obtain the revised fingernail border.

In some instances, the system may provide the respective first portion associated with each initial fingernail border as input to a second machine learning model and determine the set of revised fingernail borders using the second machine learning model, based on the respective first portions and the symmetrical projections.

As may be shown in FIG. 6A, the initial fingernail border 605 may be asymmetrical. Having a revised border that is symmetrical on the left and right sides may be helpful to generate a symmetrical artificial fingernail, so that it may be easier for the system to alter the decoration pattern to make a printed decoration that fits the artificial fingernail without distorting the decoration pattern.

Figure 6B:
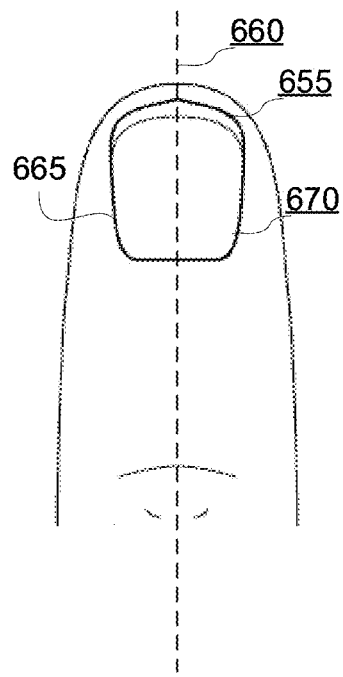

FIG. 6B depicts an exemplary revised fingernail border 655 based on the initial fingernail border 605 depicted in FIG. 6A. To obtain the revised fingernail border 655 depicted in FIG. 6B, the system may select the first portion 615 as a base portion, generate a mirror projection of the first portion 615 and replace the second portion 620 with the mirror projection of the first portion 615. As is shown in FIG. 6B, the area within the revised fingernail border 655 may comprise a first portion 665, which may be similar to the first portion 615 associated with the initial fingernail border 605. The area with the revised fingernail border may also comprise a second portion 670, which may be similar to a symmetrical projection of the first portion 615 associated with the initial fingernail border 605. FIG. 6B may be merely an example, and other ways to generate the revised fingernail border 655 are possible. For example, the system may use the second portion 620 associated with the initial fingernail border 605 and the symmetrical projection of that second portion 620 to generate the revised fingernail border 655. The system may select one portion over the other portion to generate the symmetrical projection based on a variety of criteria (e.g., whether the one portion is distorted, in the image, to a greater extent than the other portion). A machine learning model configured to select the base portion of the initial fingernail border may be used in the selection. The machine learning model may be trained to select a base portion based on a training data set comprising a plurality of training images.

The system may also optimize the revised fingernail border 655 (e.g., smooth any uneven portion of the revised fingernail border 655 to create a more natural look, or modifying the shape of the revised fingernail border 655 to create a prettier shape). For example, as depicted in FIG. 6B, the revised fingernail border 655 may comprise a sharp corner 680 in the middle of the free edge due to the symmetrical projection. The system may smooth the sharp corner 680. For another example, the user may want the artificial fingernail to have a longer free edge portion than the user's actual fingernail. The system may extend the portion of the revised fingernail border 655 based on the user's need. The system may optimize the revised fingernail border 655 by using a machine learning model. The machine learning model may be trained to optimize the shape of the revised fingernail border based on a training data set comprising a plurality of training images, each training image of the training data set comprises a label identifying at least one original version of the revised fingernail border and a corresponding optimized version of the revised fingernail border in the training image.

At step 335, the system may determine, for the set of fingernails and based on a reference table, a set of curvature factors based on the user attribute parameters. The reference table may indicate, for different combinations of user attribute parameter values, a corresponding curvature factor comprising one or more curvature parameters for each respective fingernail of the set of fingernails. A curvature factor of a fingernail may indicate an amount by which the curve, of a fingernail viewed from the fingertip, deviates from being a straight line.

Figures 7A, 7B:
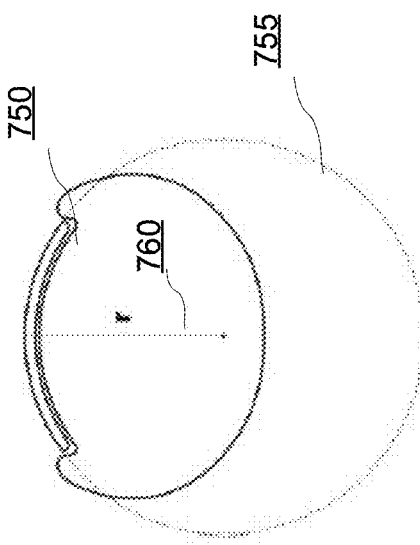
FIG. 7A depicts an exemplary reference table in accordance with one or more illustrative aspects discussed herein.
FIGS. 7B depicts an illustrative end-on view of a fingernail in accordance with one or more illustrative aspects discussed herein.

The curvature factor may be indicated in the reference table by the radius of transverse fingernail curvature. The radius of transverse fingernail curvature may be referred to as the radius of a circle that approximates the curve of a fingernail viewed from the end on (e.g., viewed at the tip of the finger). FIG. 7B depicts an illustrative example of the radius of transverse fingernail curvature. As is shown in FIG. 7B, a finger 750 is viewed at the tip of the finger. A circle 755 may approximate the curve of the fingernail of that finger 750. The radius 760 of the circle 755 may therefore be referred to as the radius of transverse fingernail curvature 760. It is appreciated that the curvature factor may be indicated by other parameters. It is also appreciated that different portions of the fingernail may curve differently. For example, the upper portion of the fingernail that is closer to the free edge may curve differently from the lower portion of the fingernail that is closer to the cuticle. Therefore, to achieve higher accuracy, more than one curvature parameter may be used to indicate the curves associated with different portions of a fingernail.

The reference table may be helpful to provide information associated with the actual size and/or shape of a user's fingernail in a three-dimensional space. Using the reference table, the system may not need to view the fingernails from perspectives other than a top-down view. For example, using the reference table, the system may not need to obtain images comprising the fingernails viewed from the fingertips in order to learn the curvature factor of each fingernail. That may ease the burden of both the user and the system during the process of making customized artificial fingernails.

In some implementations, the user attribute parameters may be age and gender. FIG. 7A depicts an exemplary reference table indicating, for different combinations of age values and gender values, a corresponding curvature factor for each respective fingernail. In order to determine the set of curvature factors for the set of fingernails of the user, the system may obtain an age value and a gender value of the user (e.g., from the user device). The system may determine the age group the user belongs to. The system may look up the reference table (e.g., by searching at memory storing the reference table) to obtain the curvature factor of each of the user's fingernails. For example, the system may receive user attribute parameters indicating the user is a woman at the age of 43. The system may determine the user is in her 40s. The system may look up the reference table and find information similar to column 740 as is shown in FIG. 7A. The system may determine the mean radius of the user's thumb, index finger, middle finger, right finger, and little finger is 9.6 mm, 7.2 mm, 7.4 mm, 6.4 mm, and 5.0 mm respectively. Similarly, if the system receives user attribute parameters of a user indicating that the user is a woman in the age of 50s, the system may look up for the reference table and find information similar to as is shown in column 730, and the system may determine the mean radius of the user's thumb, index finger, middle finger, right finger, and little finger is 9.6 mm, 7.2 mm, 7.4 mm, 6.4 mm, and 5.0 mm respectively. The reference table may also comprise information reflecting curvature factors corresponding to women in other age groups, and/or information reflecting curvature factors corresponding to men in each age group.

Other combinations of user attribute parameters are possible. For example, the reference table may also include handedness values. For example, for a user within a certain age and/or gender group (e.g., women in the age of 40s), the curvature factor of each fingernail of the user's dominant hand may be different from the curvature factor of the corresponding fingernail in the user's non-dominant hand. The reference table may include the curvature factors for both the dominant hand and the non-dominant hand. For another example, as is also shown in FIG. 7A, the reference table may include the median value of the radius of each fingernail (e.g., listed in the "mean" columns 720, 730), as well as the one standard deviation of the radius of each finger (e.g., listed in the "SD" columns 725, 735). The system may determine whether to apply the standard deviation value based on one or more user attribute parameters. The user attribute parameters may comprise the size of the user's hand. For example, the reference table may also have information regarding the median size of a hand of each group of users. If the user's hand is larger than a threshold, the system may determine to apply the curvature factor as the mean value plus one standard deviation. For example, if the user is a woman in her 40s, the system may determine the curvature factor of her thumb is 9.6+0.8=10.4 mm. Similarly, if the user's size of the hand is below another threshold, the system may determine to use the mean value minus one standard deviation. Consistent with the example that the user is a woman in her 40s, the system may determine the curvature factor of her thumb is 9.6−0.8=8.8 mm.

At step 340, the system may generate, for the set of fingernails, a set of scaled and flattened nail masks based on the set of revised fingernail borders. The scaled and flattened fingernail mask may be a fingernail mask in a two-dimensional space that matches the shape and/or size of the corresponding fingernail of the user in reality. For example, a fingernail mask may match the shape and/or size of the corresponding fingernail of the user in reality if an artificial fingernail produced based on the size and shape of a scaled and flattened fingernail mask covers the visible portion of the nail plate of the corresponding finger in reality.

The system may start with the set of revised fingernail borders as discussed above to generate the set of scaled and flattened nail masks. Generating a given scaled and flattened nail mask corresponding to a respective fingernail may be based on applying a corresponding scaling factor, of the set of scaling factors, and a corresponding curvature factor, of the set of curvature factors, to the corresponding revised fingernail border, of the set of revised fingernail borders.

In some instances, the system may first, for each fingernail of the set of fingernails, generate a scaled nail mask (e.g., a fingernail mask with a size that corresponds to the actual corresponding fingernail of the user) by applying the corresponding scaling factor, of the set of scaling factors, to the corresponding revised fingernail border, of the set of revised fingernail borders. The scaling factor, as discussed in step 315 above, may be calculated based on the reference object presented in the corresponding image where the view of the corresponding fingernail is presented. And then, the system may apply the corresponding curvature factor, of the set of curvature factors, to the corresponding scaled fingernail mask. The system may apply the corresponding curvature factor by extending the scaled nail mask horizontally. For example, the system may determine the width of the revised fingernail border based on the scaling factors associated with the corresponding image. And then, the system may calculate an arc length corresponding to the arc of the fingernail viewed at the tip of the finger. The calculation may be based on the width of the revised fingernail border and the curvature factor (e.g., the radius of transverse fingernail curvature as discussed above). The system may then "flatten" the revised fingernail border by extending the revised fingernail border horizontally, so that the width of the flattened revised fingernail border (e.g., the flattened mask) matches the calculated arc length.

In other instances, the system may first, for each fingernail of the set of fingernails, generate a corresponding flattened fingernail mask by applying the corresponding curvature factor, of the set of curvature factors, to the corresponding revised fingernail border, of the set of revised fingernail borders. For example, the flattened fingernail mask may be generated by extending the area associated with the revised fingernail border horizontally. And then the system may apply the corresponding scaling factor, of the set of scaling factors, to the corresponding flattened nail mask to provide the fingernail mask an actual size corresponding to the fingernail of the user in reality.

The set of fingernail masks may be optimized. For example, each of the fingernail masks may have a free edge area that is longer than the corresponding fingernail of the user, or may have a free edge area that has a shape different from the corresponding fingernail of the user. This may be helpful to achieve better aesthetic value.

Figure 8:
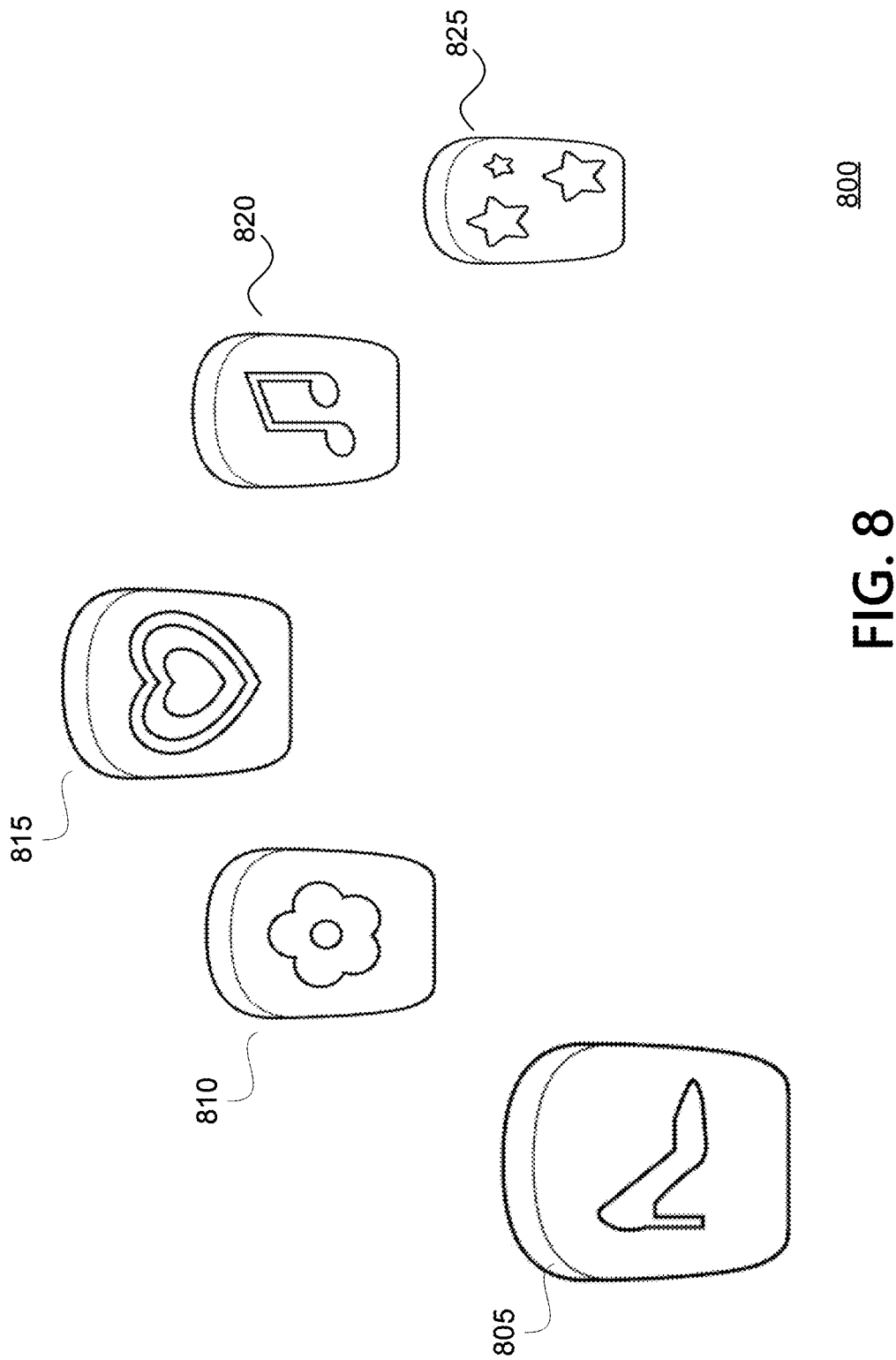
FIG. 8 depicts a set of artificial fingernails in accordance with one or more illustrative aspects discussed herein.

At step 345, the system may generate, based on the set of scaled and flattened fingernail masks, an output file for the production of a set of artificial fingernails corresponding to the set of fingernails. The output file may comprise fingernail decoration patterns that may be configured to be printed on the set of artificial nails. FIG. 8 depicts an example set of artificial fingernails 800 produced based on the output file. The set of artificial fingernails 800 may comprise an artificial fingernail 805 that is configured to be attached to the user's right thumb, an artificial fingernail 810 that may be configured to be attached to the user's right index finger, an artificial fingernail 815 that may be configured to be attached to the user's right middle finger, an artificial fingernail 820 that may be configured to be attached to the user's right ring finger, and an artificial fingernail 825 that is configured to be attached to the user's right pinky finger. The set of artificial fingernails may also comprise five artificial fingernails that may be configured to be attached to the user's left hand. Each of the set of artificial fingernails may be produced based on a corresponding scaled and flattened fingernail mask (e.g., having the same size and/or shape with the corresponding scaled and flatten fingernail mask). The set of artificial fingernails may be produced by a computing device 101 within the system, or be produced by a third party based on the output file.

The set of artificial fingernails may be in a set of two-dimensional (2D) artificial fingernails or a set of three-dimensional (3D) artificial fingernails. A set of 2D artificial fingernails may be printed on soft materials that can be bend over easily (e.g., on a piece of plastic paper). The user may attach each of the artificial fingernails to the user's fingernail by bending the 2D artificial fingernail over and sticking the artificial fingernails on the corresponding fingernail of the user. A set of 3D artificial fingernails may have already been bent over during manufacture to have a curve that may fit the curve of the user's fingernail. Production of a set of 3D artificial fingernails may comprise applying the curvature factor of each fingernail to the scaled and flattened fingernail mask.

Figure 4:
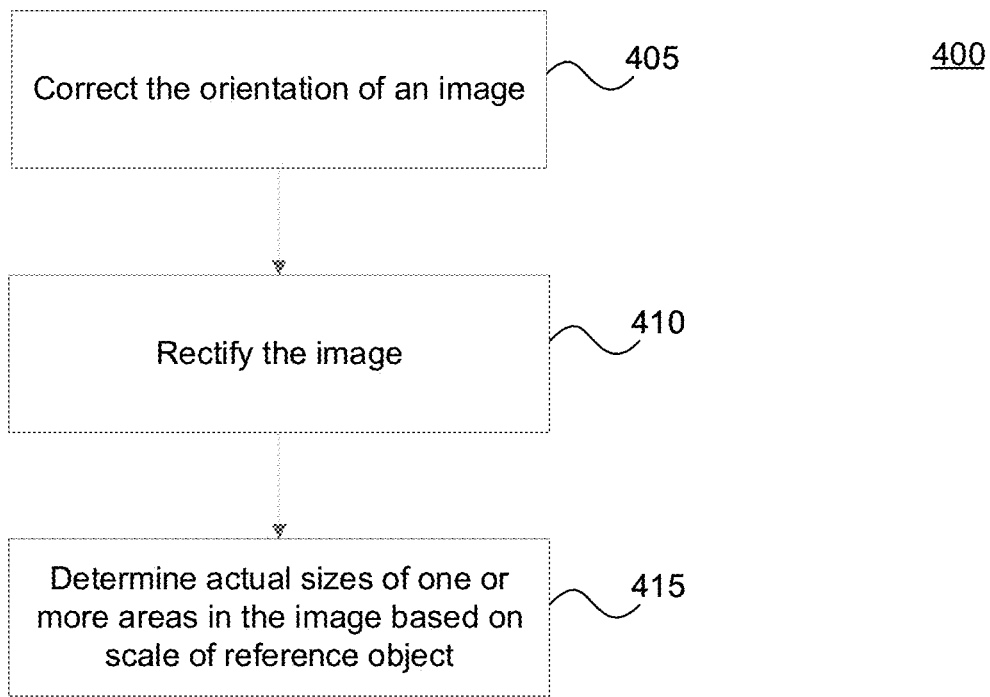
FIG. 4 depicts a flow diagram of an example method for processing a given image based on one or more scaling factors in accordance with one or more illustrative aspects discussed herein.

FIG. 4 depicts a flow chart of an exemplary method to process a given image based on scaling factors associated with the image. The given image may be an image in the set of images depicted in FIG. 3.

At step 405, the system may correct the orientation of a given image based on a rotation factor as may be described in FIG. 3. As discussed above, a rotation factor may indicate the degree that the image needs to be rotated to obtain a desired orientation. A desired orientation may be determined in a variety of ways. For example, the system may detect a gross border of one or more fingernails in a given image, and then rotate the image so that the central point of the free edge of one or more fingernails (e.g., reference point (3) as shown in FIG. 2) viewed in the image around the top of the image and is in parallel with the vertical axis of the image. For another example, the system may detect one or more edges of the reference object and then rotate a certain edge of the reference object to a certain direction (e.g., the shorter edge of a rectangular reference object being parallel to the vertical axis of the image). If the system performs orientation corrections to each image of the set of images as described in FIG. 3, the system may rotate at least some of the images in the set of images to the same orientation.

At step 410, the system may rectify a given image based on a respective scaling factor (e.g., the skew factor). Referring to FIG. 5D, as discussed above, a skew factor may be calculated based on the left edge of the reference object 590 is longer than the right edge of the reference object in a certain amount. The system may rectify the image by amplifying each portion of the image differently, so that in the rectified image, both the left edge and the right edge of the reference object 590 are in the same length in the image, and both the upper edge and the lower edge of the reference object 590 are in parallel with each other. The rectified image may be similar to as shown in FIG. 5A, where both the reference object and views of the fingernails are more approximate to a strict top-down view.

At step 415, the system may obtain an actual size of a given area (e.g., an area associated with a fingernail in various steps described below) in the image based on a scale of reference object (e.g., a size factor). For example, the system may calculate the length and/or width of a fingernail based on each pixel represents a certain number of millimeters in the reality.

Some or all steps depicted in FIG. 4 may be replaced or omitted. Different steps in FIG. 4 may be performed during different stages as described in FIG. 3. For example, step 405 and step 410 may be performed before, or during, step 320, while step 415 may be performed after step 335.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating a set of customized artificial fingernails for a user, the method comprising:

receiving, by a computing device, a set of images and one or more user attribute parameters, wherein the set of images comprise top-down views of a set of fingernails of the user, wherein each image of the set of images comprises at least one reference object, and wherein the one or more user attribute parameters comprise demographic information corresponding to the user;

determining, by the computing device and based on a corresponding reference object in each respective image of the set of images, a set of scaling factors for the set of images;

detecting, by the computing device and for the set of fingernails using one or more machine learning models configured to detect an initial fingernail border for a fingernail in an image, a set of initial fingernail borders within the set of images, wherein each initial fingernail border corresponds to a respective area, of a corresponding image, associated with a respective fingernail and distinguished from a remainder of the corresponding image;

dividing, by the computing device and for each fingernail of the set of fingernails, the respective area associated with the corresponding initial fingernail border into a corresponding first portion and a second portion;

determining, by the computing device and based on the respective first portion associated with each initial fingernail border and a symmetrical projection of the respective first portion, a set of revised fingernail borders within the set of images;

determining, by the computing device and for the set of fingernails and based on a reference table, a set of curvature factors based on the user attribute parameters, wherein the reference table indicates, for different combinations of user attribute parameter values, a corresponding curvature factor comprising one or more curvature parameters for each respective fingernail of the set of fingernails;

generating, by the computing device and for the set of fingernails, a set of scaled and flattened two-dimensional nail masks based on the set of revised fingernail borders, wherein generating a given scaled and flattened nail mask corresponding to a respective fingernail is based on applying a corresponding scaling factor, of the set of scaling factors, and a corresponding curvature factor, of the set of curvature factors, to the corresponding revised fingernail border, of the set of revised fingernail borders; and generating, by the computing device and based on the set of scaled and flattened two-dimensional nail masks, three-dimensional model data for production of a set of customized artificial nails corresponding to the set of fingernails by applying the corresponding curvature factors to the set of scaled and flattened two-dimensional nail masks.

2. The method of claim 1, wherein the reference table indicates, for different values of age and gender, different curvature factors for each respective fingernail of the set of fingernails.

3. The method of claim 1, wherein the one or more user attribute parameters further comprise handedness of the user.

4. The method of claim 1, wherein determining, based on the respective first portion associated with each initial fingernail border and a symmetrical projection of the respective first portion, a set of revised fingernail borders within the set of images comprises:

providing the respective first portion associated with each initial fingernail border as input to a second machine learning model; and determining the set of revised fingernail borders using the second machine learning model, based on the respective first portions and the symmetrical projections.

5. The method of claim 1, wherein detecting the set of initial fingernail borders within the set of images comprises:

determining, for the set of fingernails, a set of rough initial fingernail borders within the set of images; and generating, using the machine learning model and based on the set of rough initial fingernail borders, a set of refined initial fingernail borders within the set of images as the set of initial fingernail borders.

6. The method of claim 1, wherein the set of images comprise:

a first image comprising a first reference object and top-down view of a thumb of the user; and a second image comprising a second reference object and top-down view of:

an index finger, a middle finger, a ring finger, and a pinky finger of the user.

7. The method of claim 1, wherein generating the given scaled and flattened two-dimensional nail mask corresponding to the respective fingernail comprises:

generating a corresponding scaled nail mask by applying the corresponding scaling factor, of the set of scaling factors, to the corresponding revised fingernail border, of the set of revised fingernail borders; and applying the corresponding curvature factor, of the set of curvature factors, to the corresponding scaled nail mask.

8. The method of claim 1, wherein generating the given scaled and flattened two-dimensional nail mask corresponding to the respective fingernail comprises:

generating a corresponding flattened nail mask by applying the corresponding curvature factor, of the set of curvature factors, to the corresponding revised fingernail border, of the set of revised fingernail borders; and applying the corresponding scaling factor, of the set of scaling factors, to the corresponding flattened nail mask.

9. The method of claim 1, further comprising:

detecting, using a second machine learning model, a presence of a health issue in one of the set of fingernails, wherein the second machine learning model is trained to recognize the health issue based on a training data set comprising a plurality of training images, each training image of the training data set comprises a label identifying at least one health issue of a fingernail in the training image; and adjusting, based on the presence of the health issue, the initial fingernail border, the revised fingernail border, or the curvature factor corresponding to the one of the set of fingernails.

10. The method of claim 1, further comprising:

detecting, using a second machine learning model, personally identifiable information presented in the set of images, wherein the second machine learning model is trained to recognize personally identifiable information; and blurring, prior to determining the set of revised fingernail borders, the personally identifiable information in the set of images.

11. The method of claim 1, wherein the set of scaling factors comprise a set of skew factors, and wherein the method further comprises:

applying, to each image of the set of images, a corresponding skew factor prior to detecting one or more initial fingernail borders in the respective image.

12. A computer-implemented method for generating a set of customized artificial fingernails for a user, the method comprising:

receiving, by a computing device, a first image and one or more user attribute parameters, wherein the first image comprises a top-down view of a set of fingernails of the user and at least one reference object, and wherein the one or more user attribute parameters comprise demographic information corresponding to the user;

detecting, by the computing device and for the set of fingernails using one or more machine learning models configured to detect an initial fingernail border for a fingernail in an image, a set of initial fingernail borders within the first image, wherein each initial fingernail border corresponds to a respective area, of a corresponding image, associated with a respective fingernail and distinguished from a remainder of the first image;

dividing, by the computing device and for each fingernail of the set of fingernails, the respective area of the corresponding initial fingernail border into a corresponding first portion and a second portion;

determining, by the computing device and based on the respective first portion associated with each initial fingernail border and a symmetrical projection of the respective first portion, a set of revised fingernail borders within the first image;

determining, by the computing device and based on the at least one reference object in the first image, at least one scaling factor for the first image;

determining, by the computing device and for the set of fingernails and based on a reference table, a set of curvature factors based on the user attribute parameters, wherein the reference table indicates, for different combinations of user attribute parameter values, a corresponding curvature factor comprising one or more curvature parameters for each respective fingernail of the set of fingernails;

generating, by the computing device and for the set of fingernails, a set of scaled and flattened two-dimensional nail masks based on the set of revised fingernail borders, wherein generating a given scaled and flattened nail mask corresponding to a respective fingernail is based on applying a corresponding scaling factor, of the set of scaling factors, and a corresponding curvature factor, of the set of curvature factors, to the corresponding revised fingernail border, of the set of revised fingernail borders; and generating, by the computing device and based on the set of scaled and flattened two-dimensional nail masks, three-dimensional model data for production of a set of customized artificial nails corresponding to the set of fingernails by applying the corresponding curvature factors to the set of scaled and flattened two-dimensional nail masks.

13. The method of claim 12, wherein the reference table indicates, for different values of age and gender, different curvature factors for each respective fingernail of the set of fingernails.

14. The method of claim 12, wherein the one or more user attribute parameters further comprise handedness of the user.

15. The method of claim 12, wherein the first image comprises top-down view of a index finger, a middle finger, a ring finger, and a pinky finger of the user.

16. A computing device comprising:
one or more processors; and
memory storing computer instructions that, when executed by the one or more processors, cause the computing device to generate a set of customized artificial fingernails for a user by causing the computing device to:

receive a set of images and one or more user attribute parameters, wherein the set of images comprise top-down views of a set of fingernails of the user, wherein each image of the set of images comprises at least one reference object, and wherein the one or more user attribute parameters comprise demographic information corresponding to the user;

detect, for the set of fingernails and by using one or more machine learning models configured to detect an inital fingernail border for a fingernail in an image, a set of initial fingernail borders within the set of images, wherein each initial fingernail border corresponds to a respective area, of a corresponding image, associated with a respective fingernail and distinguished from a remainder of the corresponding image;

divide, for each fingernail of the set of fingernails, the respective area of the corresponding initial fingernail border into a corresponding first portion and a second portion;

determine, based on the respective first portion associated with each initial fingernail border and a symmetrical projection of the respective first portion, a set of revised fingernail borders within the set of images;

determine, based on a corresponding reference object in each respective image of the set of images, a set of scaling factors for the set of images;

determine, for the set of fingernails and based on a reference table, a set of curvature factors based on the user attribute parameters, wherein the reference table indicates, for different combinations of user attribute parameter values, a corresponding curvature factor comprising one or more curvature parameters for each respective fingernail of the set of fingernails;

generate, for the set of fingernails, a set of scaled and flattened two-dimensional nail masks based on the set of revised fingernail borders, wherein generating a given scaled and flattened nail mask corresponding to a respective fingernail is based on applying a corresponding scaling factor, of the set of scaling factors, and a corresponding curvature factor, of the set of curvature factors, to the corresponding revised fingernail border, of the set of revised fingernail borders; and generate, based on the set of scaled and flattened two dimensional nail masks, three-dimensional model data for production of a set of customized artificial nails corresponding to the set of fingernails by applying the corresponding curvature factors to the set of scaled and flattened two-dimensional nail masks.

17. The computing device of claim 16, wherein the reference table indicates, for different values of age and gender, different curvature factors for each respective fingernail of the set of fingernails.

18. The computing device of claim 16, wherein the one or more user attribute parameters further comprise handedness of the user.

* * * * *